INVENTOR
IVER L. NELSON
BY
ATTORNEY

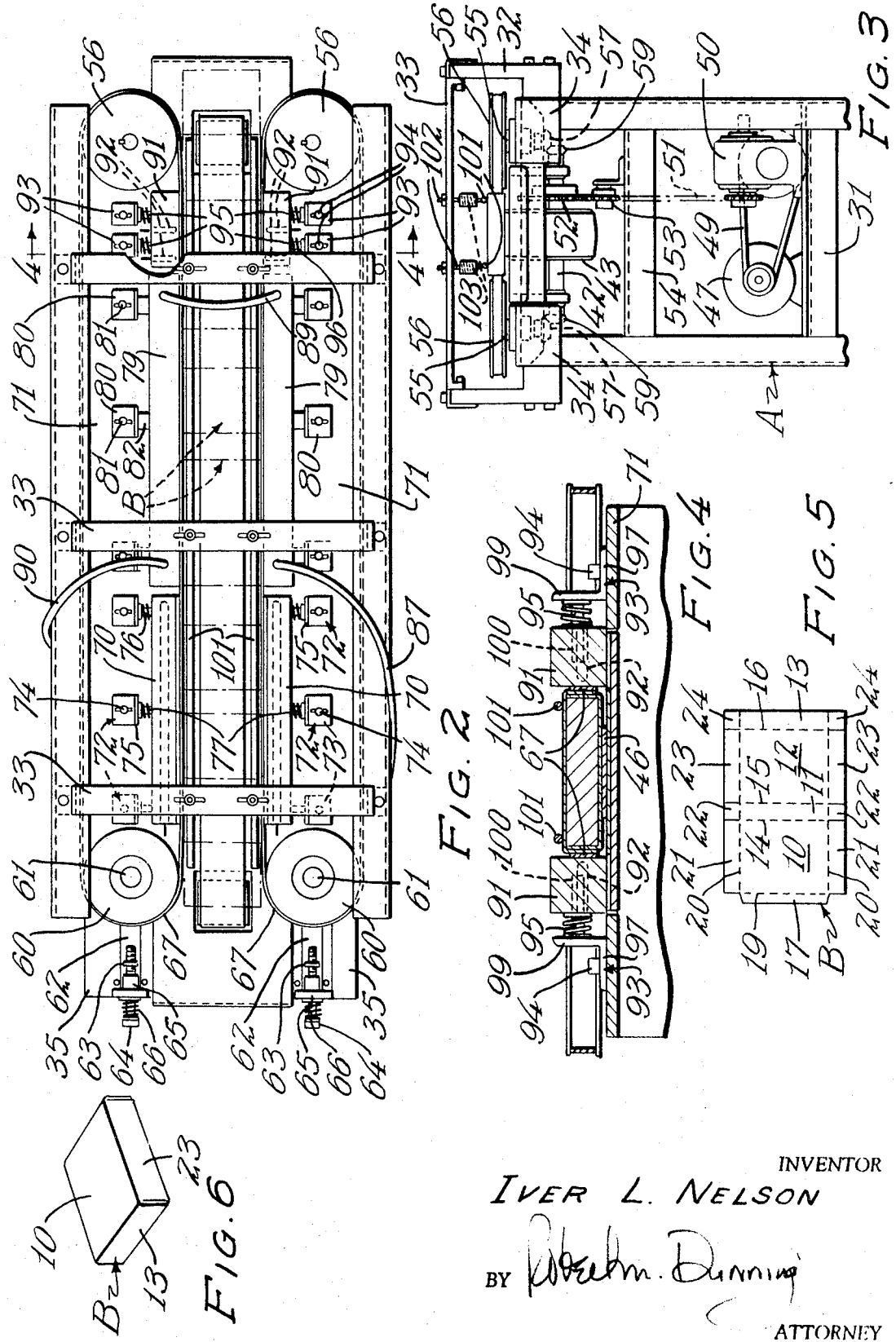

3,591,441
BAND SEALER
Iver L. Nelson, Minneapolis, Minn., assignor to Hoerner
    Waldorf Corporation, St. Paul, Minn.
    Filed June 5, 1967, Ser. No. 643,690
        Int. Cl. B32b 29/00
U.S. Cl. 156—498                                    5 Claims

ABSTRACT OF THE DISCLOSURE

This invention relates to a band type heat sealer for sealing the closure flaps of wax coated cartons and the like and the method of sealing the carton. The sealer includes a heating element in face contact with a band of heat conductive material such as stainless steel capable of transmitting sufficient heat to penetrate the outer layer of paperboard and to melt the coating between the outer layer and an inner layer of paperboard. The sealer includes a cooling element in contact with the band capable of reducing the temperature sufficiently to band the two layers together. The sealer also includes a second heating element in contact with the band capable of heating the surface of the outer layer of coated paperboard sufficiently to free the coating from the band and to glaze the outer surface of the coating on the outer layer, the heat provided by the second heating element being insufficient to penetrate the outer layer of paperboard and affect the band between the layers of paperboard.

---

The method consists in the heating, cooling and reheating steps described.

This invention relates to an improvement in band sealer and deals particularly with a method and apparatus for sealing two paperboard surfaces in face contact, the surfaces bearing a coating of wax or other fusible material capable of becoming adhesive upon the application of heat.

BACKGROUND OF THE INVENTION

During recent years equipment has been produced for sealing two films in face contact, at least one of the films bearing a coating of material capable of becoming adhesive when heated to a predetermined temperature. When the process is continuous, the equipment oftentimes includes a pair of opposed flexible endless bands of stainless steel or other heat conductive material between which the surfaces are compressed. The outer surfaces of the bands are moved past a heating element, usually in the form of a metal bar in which one or more heating elements is embedded. The heat from such a heating element is transmitted through each band, heating the surfaces to be sealed sufficiently to cause them to seal together. The surface being sealed must be held clamped between the bands until the coating has solidified so that the surfaces will not separate when released. To speed up this process, a cooling element is often provided engageable with the outer surface of the band to withdraw heat from the band. By this means the seal is more quickly effected.

It has been found that when certain types of coatings come into contact with the flexible heat conductive bands, the coating tends to cling to the bands when they are chilled. When this occurs, the films adhere to the bands, often breaking the seal which has been effected, and causing a build-up of foreign material upon the bands. This is particularly true where the bands are being used to seal the closure flaps of paperboard cartons which have been coated on their outer surfaces with the heat and pressure sensitive coating. The bands must remain in contact with the outer surfaces of the flaps until the heat penetrates through the paperboard between the outer flaps and an inner flap. When the bands are chilled, the coating on the outermost flap or surface tends to adhere the outermost flap to the band, marring the appearance of the package and oftentimes ruining the effectiveness of the seal between the flaps. It is the purpose of the present invention to avoid this difficulty.

SUMMARY OF THE INVENTION

In the present description, the apparatus illustrated is for use in sealing together the closure flaps of what is known as a regular paste end type carton in which an outermost flap is to be sealed to a similar flap lying inwardly of the outermost flap. As cartons of this type are normally provided with similar closure flap at opposite ends of the tubular carton, the apparatus illustrated is capable of sealing both ends of the carton simultaneously. Modifications of the described equipment may be used for other types of cartons, folders and the like.

In order to effect the seal, the cartons are engaged between a pair of endless belts of heat conductive material such as stainless steel which are arranged on parallel axes with the inner reaches of the belts in opposed parallel relation. The outermost closure flaps at opposite ends of the carton are in face contact with the inner surfaces of the belts. The outer surfaces of the inner reaches of the belts first move along the wall of a heating element. Heat is transmitted through the belts to the outer surface of the outer closure flaps, this heat penetrating the outer closure flaps and raising the temperature of the coating on the inner closure flaps sufficiently to cause the inner and outer flaps to adhere together. Further movement of the belts brings the outer surfaces thereof into contact with a cooling element which quickly withdraws heat from the belts and the closure flaps of the carton. The temperature of the closure flaps is thus reduced to provide an effective seal between the inner and outer flaps.

To this point, the structure is generally conventional. However, in the present arrangement, after passing the cooling element, the conveyor bands come in contact with a second heating element which reheats the belts. This second heating element does not preheat the belts to the extent necessary to cause the heat to penetrate through the outer closing flap. Instead, the second heating element merely raises the temperature of the exposed coating on the outermost closure flap, releasing the coating from the heat conductive bands and leaving the coating on the outermost flaps in a smooth shiny condition. This second heating step heats the outermost coating merely to about the softening point of the coating so that the coating cools quickly as soon as it moves out of engagement with the heat conductive bands.

A feature of the present invention resides in the method of sealing together paperboard panels such as closure flaps of a carton which flaps have been coated on at least their outer surfaces with their heat sensitive coating. The method consists in the steps of transmitting heat to the outerfost surface of the outermost flap which is sufficient to soften the coating on the outer surface of the innermost flap to produce cohesion between the two flaps, withdrawing heat through the outermost flap to the extent necessary to set the adhesive coating between the flaps, and then reheating the outer surface of the outermost flap sufficiently to restore the luster of the coating without transmitting sufficient heat through the outermost flap to affect the adhesive bond between the flaps.

These and other objects and novel features of the present invention will be more clearly and fully set forth in the following specification and claims.

BRIEF DESCRIPTION OF THE DRAWINGS

FIG. 2 is a top plan view of the same.

FIG. 3 is an end elevational view of the same.

FIG. 4 is a partial vertical section through the apparatus, the position of the section being indicated by the line 4—4 of FIG. 2.

FIG. 5 is a diagrammatic view of the blank of a carton to be sealed on the apparatus.

FIG. 6 is a perspective view of the sealed carton.

DESCRIPTION OF THE INVENTION

Figure 1:
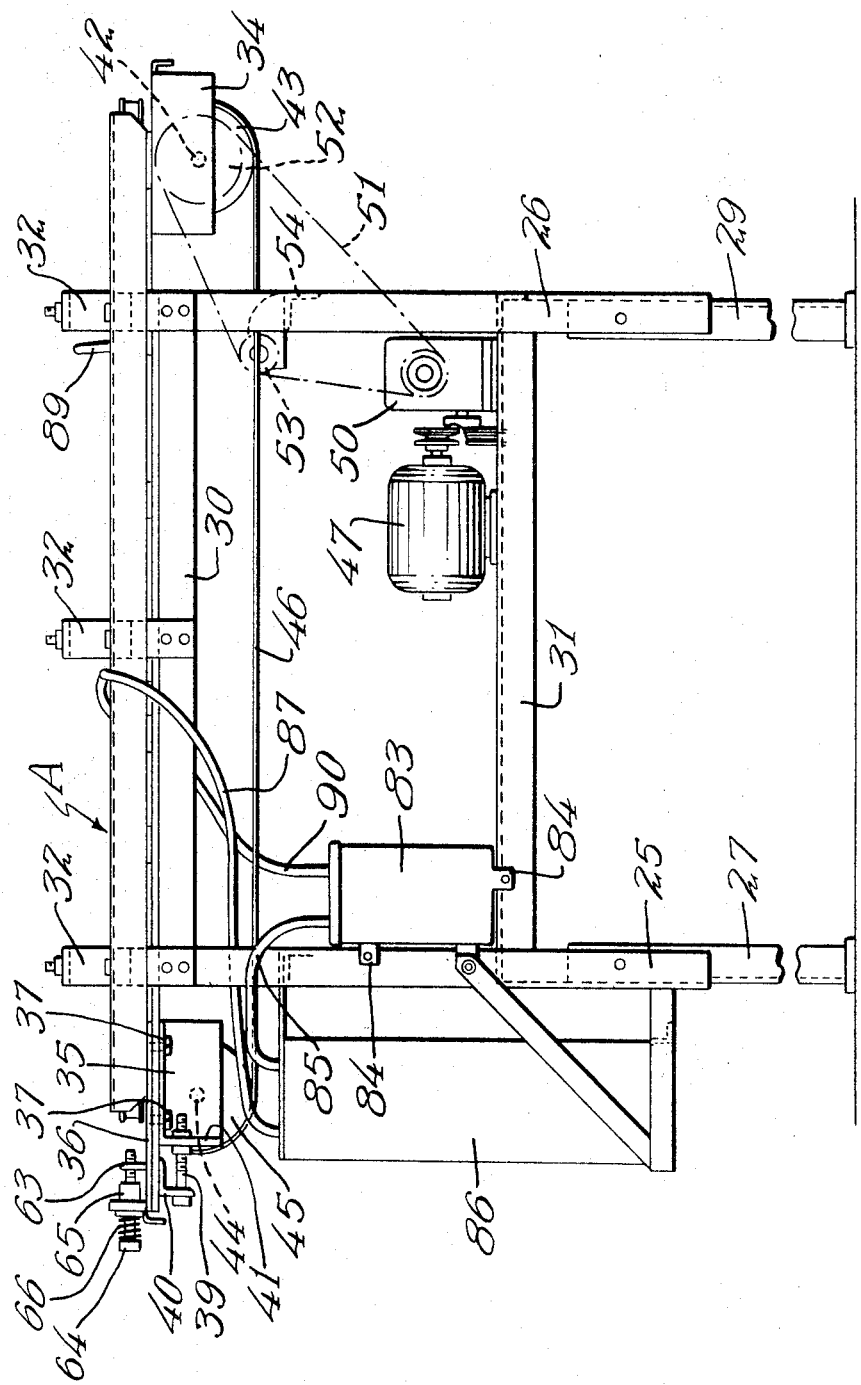
FIG. 1 is a side elevational view of the band sealer showing the general arrangement of parts.

The band sealer, which is indicated in general by the letter A, is particularly designed to seal the ends of the cartons which may be formed in the manner illustrated in FIGS. 5 and 6 of the drawings, and which are indicated in general by the letter B. As indicated in FIG. 5 of the drawings, the carton B includes a first face panel 10, a first wall panel 11, and a second face panel 12, and a second wall panel 13, the panels being foldably connected along fold lines 14, 15, and 16. A glue flap 17 is connected to one end panel of the series, such as the face panel 10 along a fold line 19 parallel to the previously described fold lines.

The panels 10, 11, 12, and 13 are foldably connected along parallel fold lines 20 to closure flaps 21, 22, 23, and 24. When the carton B is glued in tubular form by adhering the glue flap 17 to the inner surface of the panel 13, the ends may be closed by first folding the flaps 22, 24 into coplanar relation, and then folding the remaining flaps 21 and 23 into face contact overlying the first folded flaps.

The band sealer A is provided with a frame including a pair of parallel upright leg units 25 and 26 near opposite ends thereof. Each leg unit 25 and 26 includes a pair of laterally spaced legs each having adjustable lower end portions indicated at 27 and 29, respectively. The opposite sides of the frame units are connected by a pair of longitudinally extending frame members 30. The legs of the leg unit are also connected by a shelf or platform 31 which is spaced below the frame members 30. The frame members 31 are provided with longitudinally spaced uprights 32 arranged in oppositely disposed relation. Cross connecting members 33 extend transversely across the frame between the upper ends of the uprights 32 of each pair.

Fixed brackets 34 are supported upon the discharge ends of the frame strips 30, and adjustable brackets 35 are supported by extensions 36 of the frame strips 30 at the inlet end of the apparatus. The brackets 35 are secured to the extensions 36 by bolts 37 which extend through parallel longitudinal slots in the brackets 35 and are threaded into the extensions 36. As indicated in FIG. 1 of the drawings, adjustment bolts 39 extend through angle brackets 40 on the extensions 36 and extend through a vertical flange 41 on each of the brackets 35 to permit longitudinal adjustment of the brackets 35 when the bolts 37 are loosened.

The brackets 33 are supported with suitable bearings for supporting a shaft 42 which supports a conveyor roller or pulley 43, the shaft 42 extending horizontally transversely across the machine. The opposed brackets 37 also support a transverse shaft 43 which is longitudinally adjustable with the brackets. The shaft 43 supports a conveyor roller or pulley 45 in parallel relation to the roller 43. A conveyor belt 46 is supported between the rollers 43 and 45, the upper reach of which forms a support for the cartons as they move longitudinally of the apparatus.

Means is provided for driving the conveyor belts 46. As indicated in FIGS. 1 and 3 of the drawings, a motor 47 is mounted upon the platform 31, and the drive shaft of the motor 47 is connected by a suitable belt 49 to a gear reduction unit 50. The reduction unit 50 also is supported upon the platform 31 and is connected by a suitable chain 51 through a sprocket 52 on the shaft 42 to drive this shaft. The horizontal conveyor 46 is driven in this manner. An adjustable idler sprocket 53 is mounted upon a cross member 54 extending between the opposed legs 26 to maintain proper tension in the chain 51.

As is best indicated in FIG. 3, the brackets 33 support parallel vertical shafts 55 which support a pair of coplanar pulleys 56. The lower ends of the shafts 55 are equipped with bevel gears 57 which cooperate with bevel gears 59 on opposite ends of the transverse shaft 42. With this arrangement, the pulleys 56 are rotated in unison with the conveyor pulley 43. The pulleys 56 and 43 are proportioned to rotate at the same peripheral speed. A pair of pulleys 60 are supported on vertical shafts 61 mounted on slides 62 supported in ways or grooves the upper surfaces of the brackets 35. The slides 62 are provided with upwardly extending lugs 63 through which are threaded adjustment bolts 64. The bolts 64 are horizontally slidably supported for longitudinal movement through bearings 65 fixed to the brackets 35. The outer ends of the bolts 64 are provided with enlarged heads, and springs 66 are interposed between the heads of the bolts 64 and the bearings 65. The springs 66 normally tend to draw the pulleys 60 toward the inlet end of the apparatus, or away from the pulleys 56. Endless bands 67 of stainless steel or other heat conductive material extend about the pulleys 56 and the pulleys 60 at opposite ends of the scaler. The inner reaches of the bands 67 extend in spaced parallel relation, and spaced apart a proper distance to accommodate the flap supporting ends of the cartons B therebetween.

As is best illustrated in FIG. 2 of the drawings, heater elements 70 are mounted on opposite sides of the inner reaches of the bands 67 near the pulleys 60. A pair of frame plates 71 extend inwardly from the frame strips 30 on opposite sides of the conveyor belt 46 and form a fixed part of the frame. Angle brackets 72 and horizontal flanges 73 adjustably secured to the frame strips 71 by cap screws 74 or other suitable means. The vertical flanges 75 of the angle brackets 72 provided with laterally extending pins 76 which slide in parallel apertures in the heating elements 70. Springs 77 encircle the pins 76 to urge the heating element 70 into contact with the outer surfaces of the bands 67. The heating elements 70 are normally blocks of heat conductive material in which resistent elements 77 are embedded. As a result, as the bands move along the inner opposed surfaces of the heating elements, they are heated thereby.

A pair of cooling elements 79 are supported in engagement with the outer surfaces of the bands 67 after the bands move out of engagement with the heating elements 70. Angle brackets 80 are adjustably supported on the frame strips 71 by bolts 81. Arms 82 are secured to the vertical flange of the angle brackets 80 and are secured to the outer surfaces of the cooling elements 79 to connect these cooling elements in contact with the bands 67.

As is diagrammatically indicated in FIG. 1 of the drawings a combined pump and reservoir 83 is supported by brackets 84 to the frame of the apparatus. Liquid is pumped from the reservoir through a conduit 85 to a water cooler tank 86. The water 86 normally includes a cooling fluid in heat transfer relation to a coil through which the liquid is pumped. The cooling fluid being refrigerated in any suitable manner. From the water cooler 86, the cooling fluid is pumped through a conduit 87 leading to one end of one of the cooling units 79. The cooling units 79 are made of heat conductive material, and are hollow to permit the cooling fluid to flow therethrough. A conduit 89 connects the ends of the cooling element 79 most remote from the end to which the inlet conduit 87 is connected so that the cooling fluid will flow to the opposite cooling element. An outlet conduit 90 is connected to the end of the cooling element 79 opposite that to which the cooling fluid is first directed, the conduit 90 returning to the pump and reservoir 83 to be recirculated.

The cooling elements 79 act to chill the bands 67 and to withdraw heat from the ends of the cartons B with which the bands are engaged. The coolers are of sufficient length to withdraw sufficient heat so that the temperature of the carton coating is reduced below the melting point of the coating.

It has been found that when certain types of coating are employed, the coating on the outermost flap tends to adhere to the cooled band, building up a surface of coating on the band, and marring the appearance of the surfaces which have been engaged with the band. In order to avoid this difficulty a pair of opposed heating elements 91 are provided in engagement with the outer surfaces of the bands 67 after they have passed the cooling units 79. The heating elements 91 include electric resistance units 92 or similar heating means to provide the necessary heat.

Angle brackets 93 are adjustably secured to the frame strips 71 by bolts 94 or other suitable means. The vertical flanges of the angle brackets 93 are provided with pins 95 which slidably support the heating elements 91. Springs 96 encircle the pins 95 and urge the heating element 91 against the outer surfaces of the bands 67. FIG. 4 of the drawings indicates the manner in which the heating elements 91 are supported, a similar arrangement being provided for the heating elements 70. The angle brackets 93 are provided with horizontal flanges 97 which are slotted in a direction transversely of the travel of the belts, the bolts 94 extending through the slots and into the frame strips 71 as indicated. The vertical flanges 99 of the angle brackets 93 support the horizontal pins 95 which extend into sockets 100 in the heating elements 91. The heating elements are held firmly against the band 67 in this manner.

The cartons B are held upon the conveyor belt 46 by a pair of transversely spaced longitudinally extending pressure bars 101. The pressure bars 101 are supported by hangers 102 extetnding through the transverse connecting bars 32. Compression springs 103 are provided in the hangers 102 to permit the bars 101 to raise somewhat in the event the cartons jam up or become distorted when passing through the sealer.

The heating element 91 act to reheat the coating on the outermost flap or ply of paperboard to the extent necessary to melt or soften the coating on the outermost flap without penetrating through the paperboard to the extent necessary to soften the coating between the flaps. The reheating of the coating acts to prevent the coating from sticking to the bands 67. The reheating of the coating on the outermost flap also acts to smooth the coating on the flap and bring back the sheen of the coating, thereby greatly improving the appearance of the sealed cartons.

While the apparatus is particularly designed for sealing carton closure flaps, it can be used for sealing any two plies of coated paperboard having one coating between the plies and the other coating exposed. In using the word "melt" in the specification and claims, it should be mentioned this term is used to describe a condition in which the thermoplastic coating is tacky or adhesive.

In accordance with the patent statutes, I have described the principles of construction and operation of my band sealer; and while I have endeavored to set forth the best embodiment thereof, I desire to have it understood that obvious changes may be made within the following claims without departing from the spirit of my invention.

What is claimed is:

1. An apparatus for use in sealing thermoplastically coated paperboard plies together, the plies having one coating of thermoplastic material between the plies and a second exposed coating, the apparatus including means for conveying the plies while in contact, a band of heat conductive material of equal width throughout its length, means for moving said band in unison with said plies with one surface of the band in face contact with said second exposed coating, a heating element engaging the other surface of the band and heating the band sufficiently to cause penetration of heat through the ply having the exposed coating and to heat the first thermoplastic coating to melt the same, a cooling element engaging the other surface of the band during travel thereof to cool the coatings below the melting point thereof, and a second heating element engaging said band surface beyond said cooling element and spaced from said first heating element by said cooling element to soften the second exposed coating throughout the same area as that previously heated and cooled without melting the first coating.

2. An apparatus for sealing the closure flaps of paperboard cartons having a thermoplastic coating on the outer surface thereof, the closure flaps being folded into superposed relation with one closure flap lying outwardly of another and in face contact therewith, the apparatus including: conveyor means for conveying the cartons, an endless band of heat conductive material, means supporting one surface of said band in contact with said one closure flap and movable therewith upon movement of said conveyor, a first heating element, a cooling element, and a second heating element in series contacting the other surface of said band during the travel thereof while in contact with said one closing flap, said second heating element being spaced from said first heating element by said cooling element, said first heating element creating sufficient heat to penetrate said one closure flap and melt said coating on said other flap, and said second heating element heating the same area previously heated and cooled but creating insufficient heat to remelt said coating on said other flap but sufficient to soften the coating on said one closure flap during movement of said carton by said conveyor.

3. The structure of claim 2 in which said carton includes a similar closure on each end, and including a similar endless band engaging the other end of the carton and including a similar first heating element, cooling element and second heating element engaging the similar endless band.

4. The structure of claim 2 and in which said second heating element engages a relatively small area of the band relative to said first heating element.

5. The structure of claim 4 and in which said cooling element engages at least as large an area of said band as said first heating element.

References Cited
UNITED STATES PATENTS

| | | | |
|---|---|---|---|
| 2,707,018 | 4/1955 | Bolton | 156—498 |
| 2,800,162 | 7/1957 | Rohdin | 156—498 |
| 3,196,758 | 7/1965 | Saidel | 156—498 |
| 3,416,411 | 12/1968 | Hittenberger et al. | 156—497 |
| 3,249,024 | 5/1966 | Shiu | 156—497 |
| 3,367,261 | 2/1968 | Kushiwagi | 156—498 |

CARL D. QUARFORTH, Primary Examiner

F. M. GITTES, Assistant Examiner

U.S. Cl. X.R.

156—311, 499, 583